United States Patent
Sturm

(10) Patent No.: US 8,989,918 B2
(45) Date of Patent: Mar. 24, 2015

(54) SYSTEM FOR TRANSPORTING GOODS ARRANGED ON AUXILIARY DEVICES

(71) Applicant: Krones AG, Neutraubling (DE)

(72) Inventor: Volker Sturm, Wackersdorf (DE)

(73) Assignee: Krones AG, Neutraubling (DE)

(*) Notice: Subject to any disclaimer, the term of this patent is extended or adjusted under 35 U.S.C. 154(b) by 322 days.

(21) Appl. No.: 13/724,386

(22) Filed: Dec. 21, 2012

(65) Prior Publication Data
US 2013/0166108 A1    Jun. 27, 2013

(30) Foreign Application Priority Data
Dec. 23, 2011 (DE) .......................... 10 2011 089 858

(51) Int. Cl.
G05D 1/02 (2006.01)
B66F 9/06 (2006.01)

(52) U.S. Cl.
CPC ............... *G05D 1/021* (2013.01); *B66F 9/063* (2013.01)
USPC .......................................................... 701/2

(58) Field of Classification Search
USPC .......................................................... 701/2
See application file for complete search history.

(56) References Cited

U.S. PATENT DOCUMENTS

| | | | | |
|---|---|---|---|---|
| 4,252,217 | A * | 2/1981 | Benjamin ...................... | 414/592 |
| 4,508,484 | A * | 4/1985 | Heiz ............................. | 414/337 |
| 6,224,314 | B1 * | 5/2001 | Mann ............................. | 414/392 |
| 7,205,730 | B2 * | 4/2007 | Taguchi ......................... | 318/69 |
| 7,287,953 | B2 * | 10/2007 | Schratt et al. .................. | 414/807 |
| 8,127,687 | B2 * | 3/2012 | Spangler et al. ................ | 104/89 |
| 8,606,392 | B2 * | 12/2013 | Wurman et al. ............... | 700/214 |
| 8,649,899 | B2 * | 2/2014 | Wurman et al. ............... | 700/216 |
| 8,753,061 | B2 * | 6/2014 | Tseng et al. ................... | 414/343 |
| 8,892,240 | B1 * | 11/2014 | Vliet et al. ..................... | 700/216 |
| 2004/0197172 | A1 * | 10/2004 | Hansl et al. ................... | 414/281 |
| 2006/0045660 | A1 * | 3/2006 | Di Rosa ..................... | 414/139.9 |
| 2007/0288123 | A1 | 12/2007 | D'Andrea et al. | |
| 2010/0316469 | A1 * | 12/2010 | Lert et al. ...................... | 414/273 |
| 2012/0315834 | A1 * | 12/2012 | Van Der Steen et al. ..... | 452/125 |
| 2013/0180442 | A1 * | 7/2013 | Pedersen ......................... | 114/72 |

FOREIGN PATENT DOCUMENTS

| | | |
|---|---|---|
| CN | 2498121 Y | 7/2002 |
| CN | 1450480 A | 10/2003 |

(Continued)

OTHER PUBLICATIONS

Chinese First Office Action for Application No. 201210568241.7, dated Sep. 23, 2014.

(Continued)

*Primary Examiner* — Thomas Tarcza
*Assistant Examiner* — Alex C Dunn
(74) *Attorney, Agent, or Firm* — Marshall, Gerstein & Borun LLP

(57) ABSTRACT

A system for transporting goods arranged on loading devices between two areas, one area being a high-bay warehouse, includes a driverless transport system with at least one transport trolley for transporting the goods including the loading devices. The transport trolley has a lifting device which can be lifted and lowered above the trolley. The transport system furthermore includes a transfer station under which the transport trolley can drive and from which the transport trolley can accept and/or transfer loading devices with load deposited there.

23 Claims, 4 Drawing Sheets

(56) References Cited

FOREIGN PATENT DOCUMENTS

| | | |
|---|---|---|
| DE | 223 423 | 6/1985 |
| DE | 4120923 A1 | 1/1993 |
| DE | 10221603 A1 | 12/2003 |
| DE | 10 2008 018 310 | 10/2009 |
| EP | 302 569 | 2/1989 |
| WO | WO-2008/046728 | 4/2008 |
| WO | WO-2010142688 A1 | 12/2010 |

OTHER PUBLICATIONS

Search Report from Euopean Patent Office, application EP 12 19 8732, dated Mar. 13, 2013.

"Automated Guided Vehicle Systems (AGVS)", VDI-Handbuch Materialfluss und Fördertechnik, Band 2, Oct. 2005, 39 pages.

Search Report in DE Application No. 10 2011 089 858.1 dated Dec. 10, 2012, 5 pages.

* cited by examiner

SYSTEM FOR TRANSPORTING GOODS ARRANGED ON AUXILIARY DEVICES

FIELD OF THE INVENTION

The present disclosure relates to a system for transporting goods arranged on loading devices between two areas, one area being a high-bay warehouse, including a driverless transport system with at least one transport trolley for transporting the goods together with the loading devices.

BACKGROUND

In automated warehouses or so-called goods distribution centers, respectively, it is common to employ so-called "high-bay warehouses" which are designed as multistory buildings. For the storage and disbursement of loading devices with goods arranged upon them, floor-bound rack operation equipment is conventionally used which is combined with a conveyor system for storage and disbursement. The conveyor system is in most cases adapted to the respective requirements, for example the type of transport goods or the project requirements, so that different measures for conveyance can be taken. For example, stationary conveyors, such as roller conveyors, chain conveyors, deflection devices or rail-bound distribution trolleys, or else movable conveyors, such as driverless transport systems (DTS), electric ground conveyors (EGC), or electric overhead conveyors (EOC), can constitute the conveyor system.

There are different designs of "driverless" transport systems. Driverless transport systems are often employed which combine a trolley with a stationary conveyor which can accept goods to be conveyed on a loading device in a horizontal movement. Furthermore, counterweight trolleys are employed which are combined with a lifting device, such as forks of a stacker, and can thus lift, carry and lower pallets. Moreover, systems are employed which can drive under goods on a loading device to be conveyed and lift the latter from a device, transport them by carrying them and deposit them on devices. Lifting can be accomplished, by way of example, by a rotating spindle or by lifting columns, eccenters, etc.

In a conventional warehouse, the transport of the goods is accomplished, for example, from the disbursement conveyor system to shipping via a pallet handling system, or alternatively via an electric overhead conveyor or electric ground conveyor. In the shipping area, the goods are usually distributed onto gravity roller conveyors by means of cross transfer trolleys to make them ready for shipping. In plants with high performance requirements for sequencing the goods in shipping in the working range of the cross transfer trolleys, driven conveyor elements can be additionally attached on which the goods can be temporarily buffered and where the goods are subsequently withdrawn in the correct sequence and conveyed onto the gravity roller conveyors for shipping.

All conventional stationary conveyor solutions have considerable disadvantages in view of the flexibility of their utilization and are complicated to commission. The use of conventional conveyor technology requires repeated pallet transfers from one conveyor element to the next conveyor element. Each of these transfers represents a possible source of interference. Moreover, in case of maintenance or repairs, the conveying capacity is affected.

The movable conveyors offer more flexibility in view of expandability, change of travel ways, and trolley distribution, in particular the not rail-bound driverless transport systems. In many logistic solutions, the movable conveyors are combined with conventional conveyors, in particular when automatic storage systems are involved, and thus, the possible advantages of the movable conveyors are reduced.

It is therefore an object to provide a system with driverless transport systems for transporting goods arranged on loading devices, in particular in the spatial environment of a high-bay warehouse, which permits transport of the goods between the high-bay warehouse and further areas, the system including high flexibility in view of trolley expansion, changes of travel ways, and trolley distribution, and requiring only low complexity due to passive transfer devices, no cabling and electric and control-related commissioning, which is required in conventional conveyors or rail-bound systems.

SUMMARY

According to some aspects, a system for transporting goods is arranged on loading devices between two areas, one area being a high-bay warehouse, by the system comprising a driverless transport system with at least one transport trolley for transporting the goods together with the loading device, the transport trolley being designed with a lifting device which can be lifted and lowered above the trolley, and with a transfer station under which the transport trolley can drive and from which the transport trolley can accept and/or transfer loading devices with load deposited there.

In contrast to former prior art, the transport of the goods is consequently accomplished outside the high-bay warehouse, essentially via transport trolleys, i. e. one can completely dispense with common floor-bound conveyor technology, such as roller conveyors or chain conveyors, and with rail-bound conveyors, such as electric overhead conveyors or electric ground conveyors. The transport trolleys are sufficient for transporting the loading device with goods arranged upon it from a source or transfer station to the high-bay warehouse, i. e. to the rack operation equipment, and for depositing it on it, or from the high-bay warehouse to a transfer station or target, so that no additional pallet transfers are required during the whole transport. This can essentially shorten transport which can thus be done optimally as to time and paths.

With the system of the present disclosure, even complex, high-performance logistic systems can be realized with simple system components with high availability at comparatively low investment costs, with short commissioning times, with a high flexibility for performance requirements that are changing due to market changes, and at low operating costs thanks to path optimization and automated driverless trolleys.

Since the transport trolleys according to some aspects of the present disclosure are designed with a lifting device which can be lifted and lowered above the trolley, the transport trolley can have a compact design. Since the goods are transported on the trolley, i. e. above the trolley, a very well-balanced storage of the goods on the trolley is ensured, and no additional measures are required, e. g. for preventing the trolley from tilting.

The transport trolley according to some aspects of the present disclosure cooperates with a correspondingly designed transfer station, so that the transport trolley only drives under the goods to be conveyed which are arranged on the transfer station, takes them up from this position and conveys them to the desired area to deposit them again in a transfer station arranged there. Consequently, the transport system according to some aspects of the disclosure is flexible, only includes few sources of interference, and can be easily put into operation. The transfer stations can be rigid or flexible as required.

According to a preferred embodiment, it can be provided that the at least one transport trolley can be driven to be freely movable. This means that the transport trolley is not a rail-bound trolley, but the trolley can be conveyed absolutely independently at places of the high-bay warehouse for the transfer or acceptance of goods or between the incoming goods and the outgoing goods and the high-bay warehouse. This helps to achieve high flexibility because the trolley can be freely controlled as required, and one can immediately react to e. g. changes of routes.

According to a further preferred embodiment, the at least one transport trolley can be remote-controlled. This also helps to achieve particular high flexibility because the transport trolley can be conveyed directly to the desired position without the operator having to be situated directly in the region of the high-bay warehouse. Remote control here permits to currently always select the shortest possible paths, so that transport is again optimized in time.

A further preferred embodiment provides for the system to be controllable and administrable by a superimposed control system. A corresponding system permits an automated transport of the individual transport trolleys which prove in particular advantageous if several transport trolleys are controlled and also monitored simultaneously. A corresponding control system can be designed such that not only the transport trolleys, in particular their motion and/or position data, are detected, but simultaneously such functions as storage and/or return to storage, storing and/or temporary buffering, disbursement and/or provision of the complete plant, are coordinated and controlled.

It can be furthermore provided for the at least one transport trolley to include a capacitive power supply. This can save costs for ensuring voltage supply, and it is simultaneously possible to save space and weight which are otherwise required e. g. by providing a spare battery in a trolley. Capacitors are suited here, for example, for capacitive power supply. Furthermore, batteries with or without short charge cycles can be employed which do not always require complete charge cycles but can, in case of varying performance requirements, also be intermediately charged at charging zones to which a trolley can drive and which only need a complete charge cycle within cycles of e. g. one week. The temporary outage of trolleys for the charging procedure or the provision of spare batteries can thus be considerably reduced.

The transport trolley can advantageously include two-dimensional navigation according to some aspects. Corresponding two-dimensional navigation permits a sufficiently precise control of the individual transport trolleys between the intended areas.

According to another preferred embodiment, the transfer station can be designed with an entry opening. This entry opening is a very simple embodiment of the transfer station to ensure that the loading devices with load accepted from the transfer station by the transport trolley via the lifting device can also be moved away from the transfer station without the transfer station having to be removed.

The transfer station can here advantageously have a U-shaped design or be designed in the form of two opposite rail or web elements. Here, web elements also comprise bow elements which can have, for example, an L- or T-shape. Both aforementioned forms of transfer station proved to be particularly suited in operation.

According to another preferred embodiment, the transfer station can comprise non-driven conveyor means. A corresponding transfer station is here normally designed to be fixed in its stationary position. The provision of non-driven conveyor elements in the area of the transfer station permit e. g. to place or shift the loading devices with load from other areas onto the non-driven conveyor elements, e. g. roller conveyors, gravity roller conveyors or non-driven conveyor chains, and to make them then thus accessible for the transport trolleys. Since no driven conveyor elements are employed here, sources of error in particular by failures can be excluded in this area. Furthermore, a specific loading can be effected in the outgoing goods area where the individual loading devices with goods can be carried out not in sequence but according to the desired loading sequence.

According to a further preferred embodiment, the transfer station can be formed in the area of the high-bay warehouse by at least one cantilever arm of the high-bay warehouse, or else in a U-shape or in the form of two opposite rail or web elements. The cantilever arm is here formed by the steel construction of the high-bay warehouse. A corresponding transfer station ensures that the loading devices with load can be deposited on either side of the high-bay warehouse. Since the transport trolley is moved within an area protected against the access of persons, an optimal loading of the high-bay warehouse can thus be automated which can also be ensured without conventional or rail-bound conveyors.

In some aspects, the system of the present disclosure can advantageously provide for the at least one transport trolley to move the goods between the incoming goods from delivery or production and the high-bay warehouse, and/or a transport trolley to move the goods between the incoming goods through delivery or production and the high-bay warehouse and shipping. Consequently, the complete transport of the products between the incoming goods and outgoing goods, and also between the incoming goods, the high-bay warehouse and the outgoing goods, can be performed by the transport trolleys. Here, transport trolleys can first transfer the received products, in particular raw and indirect materials, to the production, temporarily store products or semi-finished products produced there in the high-bay warehouse, and optionally either return them to production or transfer them to the outgoing goods. The system according to some aspects of the present disclosure thus covers the complete area between incoming goods, production, high-bay warehouse and outgoing goods, so that the formerly existing sources of error, in particular in the area of the transfer between individual conveyor elements, can be eliminated. Consequently, transport and storage can be carried out with higher availability, more time-efficiently and thus cheaper.

It can be furthermore provided for the transfer station to be designed in the area of the outgoing goods such that the loading devices with load can be temporarily buffered and transported further in the correct sequence by employed cross transfer trolleys. The mechanism of sequencing permits a late determination of the shipping sequence for loading devices with load, an overtaking of pallets, and also a utilization of the rack operation equipment for stock removal from high-bay warehouse areas which is optimal as to the throughput.

Further features, objects and advantages of the system of the present disclosure can be taken from the detailed description of a preferred embodiment of the invention which will follow now and which serves as non-restricting example and makes reference to the annexed drawings. Equal components therefore always have the same reference numerals and are not always explained repeatedly.

DETAILED DESCRIPTION

The schematic representations of FIGS. 1 to 4 show different views of an embodiment of a transport system according to the invention.

Figure 1:
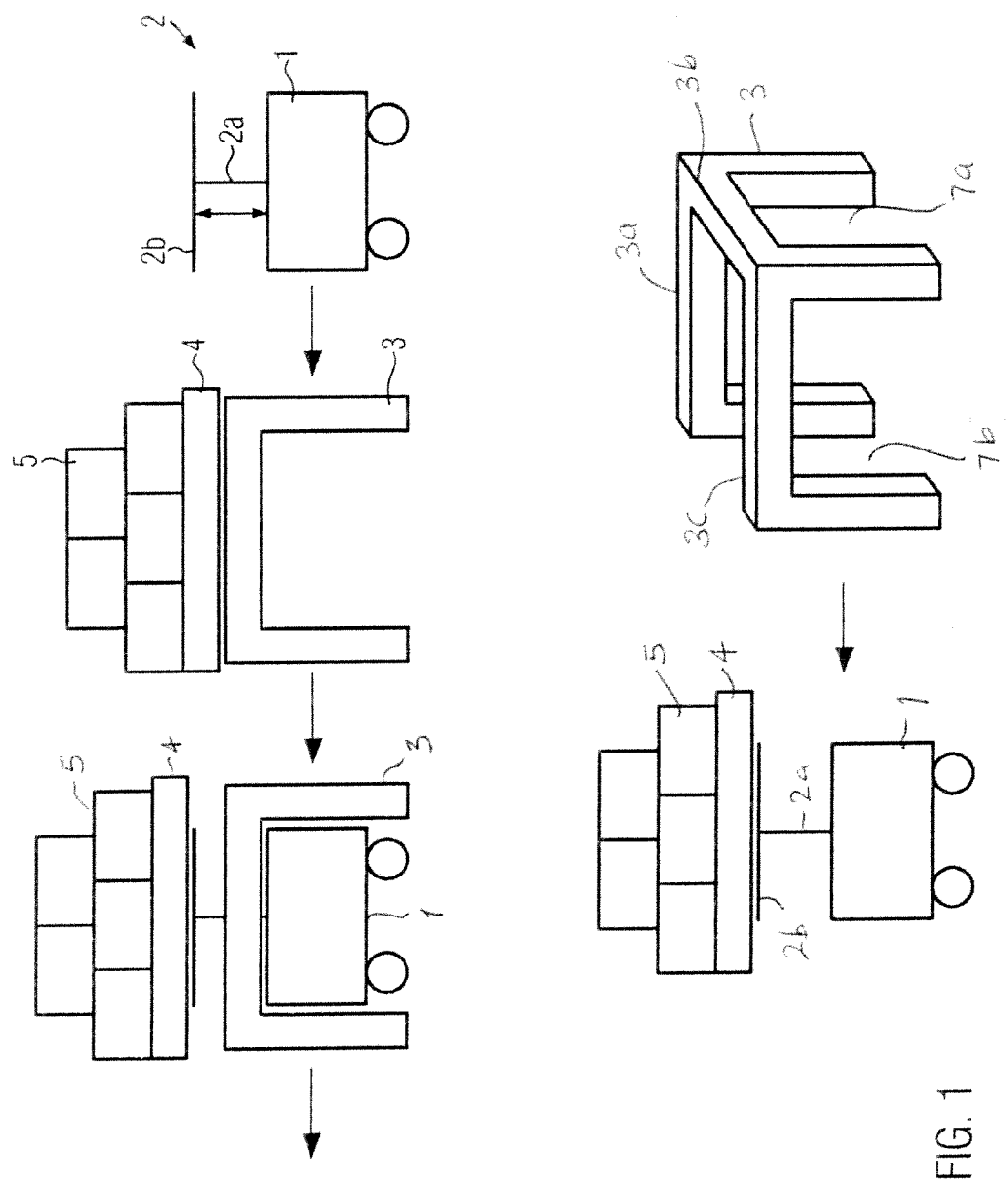
FIG. 1 shows a schematic representation of a transport system according to the present disclosure with transfer station, which is partially shown in a perspective view, and the individual steps of transferring the loading device with load from the transfer station to the transport trolley.

Here, FIG. 1 shows the loading of a transport trolley 1 at a transfer station 3. The transport trolley 1 is a driverless transport trolley of a compact design, i. e. it is preferably designed to be close to the ground. A lifting device 2 is arranged at the upper side of the transport trolley 1. The lifting device 2 comprises an adjusting element 2a and a support element 2b which can be lifted or lowered in the vertical direction by the adjusting element 2a. In its rest position, the support element 2b is preferably disposed to be as close to the surface of the transport trolley 1 as possible to support the compact design, in particular when the transport trolley is parked in a rest position. The transport trolley 1 is here embodied to be freely movable, i. e. by means of the wheels or else circulating belts or chains disposed at the bottom side, the trolley can be moved as desired, where the movement can be effected either by computer control or by remote control. No additional guidance of the transport trolley by means of rails takes place.

In operation, the transport trolley 1, with its lifting element 2 being lowered, is driven under a transfer station 3 on which pallets, i. e. loading devices 4 with goods 5 arranged on them are stored. The transfer station 3 is sufficiently high to permit the transport trolley 1 to drive under it, i. e. the height of the transport trolley 1 including its lowered lifting element 2 is lower than the distance of the bottom side of the transfer station 3 to the ground. The transfer station 3 is preferably embodied as a rack on which the loading device 4 with load 5, that means pallets, are supported. In detail, the rack of the transfer station 3, as perspectively shown in FIG. 1, has a U-shape, so that an entry opening 7a or exit opening 7b is provided at one side. The pallet consequently rests on three rack elements 3a, 3b, 3c. So, the transport trolley would only have to drive under the level of the pallet's bottom side.

The U-shape design of the rack 3 is only one preferred embodiment. For many applications, however, it may prove to be advantageous for the rack to consist of two supporting bows or frames oriented in parallel, i. e. of two rack elements. These bows can also be designed as L- or T-bows. An advantage of these embodiments is that one can drive through the racks, as two opposite entry or exit openings exist.

After the transport trolley 1 has driven under the transfer station 3, the transport trolley 1 is stopped at a position underneath the transfer station 3 and underneath the loading device 4 with load 5, and the lifting element 2 is extended until the support element 2b rests against the bottom side of the loading device 4 with load 5. Further lifting of the lifting element 2 lifts the loading device 4 with load 5 off the transfer station 3, so that the total weight of the loading device 4 and the load 5 is exclusively carried by the transport trolley 1. In this position, the support plate 2b together with the loading device 4 with load 5 is located above the transfer station 3. Subsequently, the transport trolley 1 moves again and now leaves the transfer station 3 through the exit opening 7b. Since the rack of the transfer station is interrupted here, the movement of the transport trolley is not hindered.

While the lifting element 2 is represented in this representation only with one single adjusting element 2a, it can also be designed in any other way as long as a lifting of the support plate 2b is permitted. The transport trolley 1 with the loading device 4 and goods 5 arranged upon it is then freely navigated between the transfer station 3 and the high-bay warehouse or in the high-bay warehouse, respectively, until a desired deposition device or transfer station 3 in the region of the high-bay warehouse is reached on which the loading device 4 can then be deposited in reverse order. This means, the transport trolley 1 drives into the transfer station at an entry opening corresponding to the exit opening 7b, lowers the lifting element 2 until the loading device 4 comes to lie on the transfer station 3 and is now supported by the transfer station.

Further lowering of the lifting element 2 provides a sufficient distance to the bottom side of the loading device 4 with load 5 and to the transfer station 3, so that the transport trolley 1 can drive away as required. Here, the transport trolley 1 can leave the transfer station 3 depending on its physical design in any possible direction and is no longer bound to the entry/exit opening 7a/b.

The transfer devices in the region of the high-bay warehouse are preferably formed by cantilever arms which are fixed to the steel construction of the high-bay warehouse. In particular, the transfer stations 3 are provided at one or also at both ends of an alley for the rack operation equipment and then on both or only one side of the alleys. The transfer stations 3 are then reached both by transport trolleys and rack operation equipment, and pallets, i. e. loading devices 4 with goods 5, are fetched or provided.

Since the cantilever arm points in high-bay warehouses can be simply attached as marginal points, it is possible to simply redesign existing high-bay warehouses. The cantilever arms can also be attached on ground level and be a transfer station to the rack operation equipment. By this, the conveyor technology can be completely eliminated, and the transport system can utilize the access route instead of the not existing conveyor technology.

In a high-bay warehouse, storage locations can also be designed as transfer station for storage or disbursement if these are provided in levels and rows of racking which can be reached by rack operation equipment as well as by transport trolleys 1.

In the area of the high-bay warehouse, the transfer station 3 is furthermore arranged at the rack operation equipment, so that the loading devices 4 with load 5 can be relocated from the transfer station preferably with a telescopic fork from the transfer station to storing positions of the rack steel construction.

Likewise, when goods are removed from the high-bay warehouse, the desired products 5 on loading devices 4 are relocated by means of the rack operation equipment from the rack steel construction onto a transfer station 3 from which the loading device 4 is accepted again by a transport trolley 1. The transport trolley 1 is now directed towards the outgoing goods and there placed again on a corresponding transfer station 3

On the way to the outgoing goods, a temporary buffering of the loading devices 4 with load 5 can be effected here by means of static transfer stations 3, and it can be optionally linked with arbitrary conveyor or buffer technology available on the market depending on the project. By buffering, a disbursement from the high-bay warehouse can be effected with high, ideally with maximum performance, having the disadvantage that the sequence of disbursed pallets does not always correspond to a finally required loading sequence. By means of the buffering and direct access to the required pallets, however, the required loading sequence can be produced.

Figure 2:
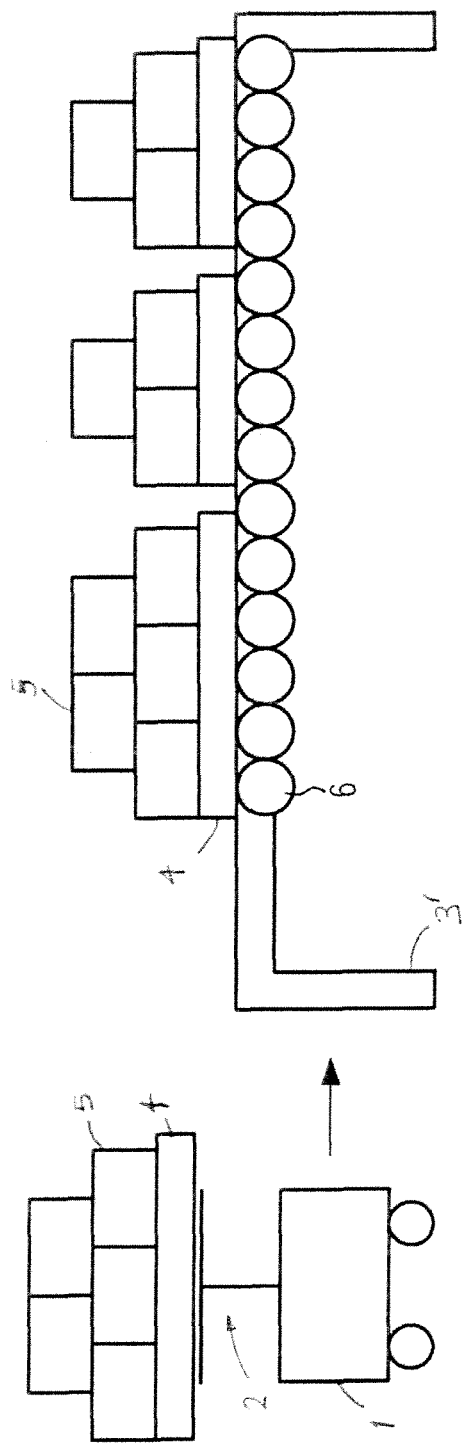
FIG. 2 shows, in a schematic side view, a loaded transport trolley and a transfer station in the area of the outgoing goods which is also designed as intermediate buffer.

Moreover, with the preparation for shipping, a further type of buffering is provided which is usually effected for rear loading observing a loading sequence on gravity roller conveyors or actively driven accumulating conveyors. Such a transfer station $3^1$ in the region of the outgoing goods is represented in FIG. 2 where the transfer station $3^1$ is partially embodied with non-driven conveyor elements, here roller elements 6, which permit further shifting of the loading devices in the area of the non-driven conveyor elements. Withdrawal towards the truck is normally accomplished by hand elevating trucks or electric pallet trucks. For loading trucks from the side, the pallets are removed directly from transfer stations by stackers which load them onto the truck by driving laterally towards them.

Figure 3:
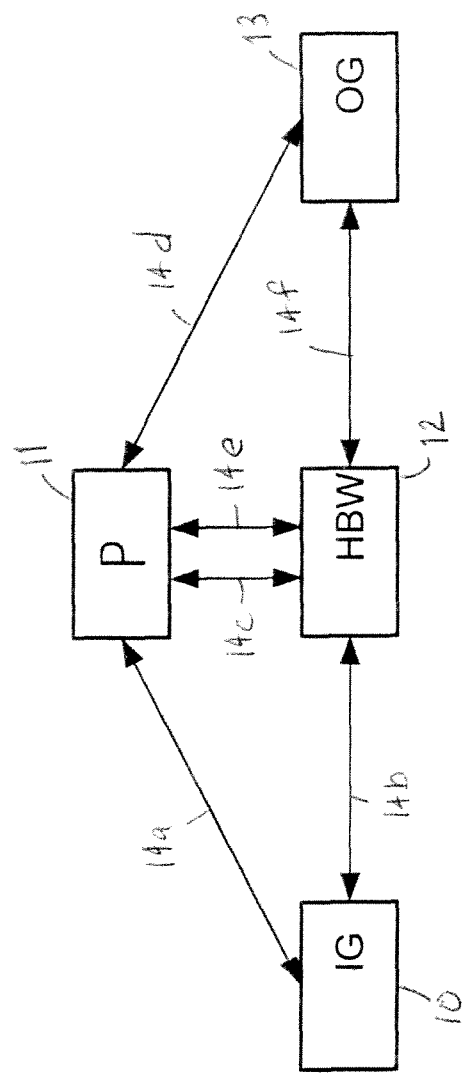
FIG. 3 schematically shows the individual stations of the transport system.

FIG. 3 schematically shows the individual areas where the transport system according to the present disclosure can be employed. First, products 5 arranged on loading devices 4 are transferred in an incoming goods area 10 from the transfer stations 3 onto the transport trolleys 1. The products 5 can be raw materials, process materials or finished products. From the incoming goods 10, the products 5 can be either driven directly to production 11 or temporarily stored in a high-bay warehouse 12. If they are temporarily stored, they are transferred to the racking, and at a later point in time, from the racking e. g. towards production. From production, the products or semi-finished products fabricated there are either transferred directly to the outgoing goods 13, or they are again temporarily stored in the high-bay warehouse 12. Each of the transport paths 14a-f is here bridged by the driverless transport trolleys 1 and can be supplemented by other conveyors depending on the project. The complete system is controlled and administered by a superimposed system, the control being realized both in a master control based on a programmable controller (SPS or Smart SPS, respectively), or in a material flow control on a computer. The transfer of the individual pallets can be supported by empty pallet detection, removal of the transport lock, labeling of the pallet designation, etc.

In the area of the outgoing goods 13, the loading devices 4 with load 5 can be distributed onto gravity roller conveyors in the correct sequence by the transfer devices 2 in the outgoing goods by means of employed cross transfer trolleys. The gravity roller conveyors are preferably not driven and serve the preparation of the pallets for shipping.

Some different embodiments for the application of the transport system according to the present disclosure between the incoming goods and the outgoing goods are described in detail with reference to FIG. 4.

According to some aspects, one can eliminate the complete craft of ascending conveyor technology in the area of the high-bay warehouse and thus achieve clear investment savings.

Figure 4:
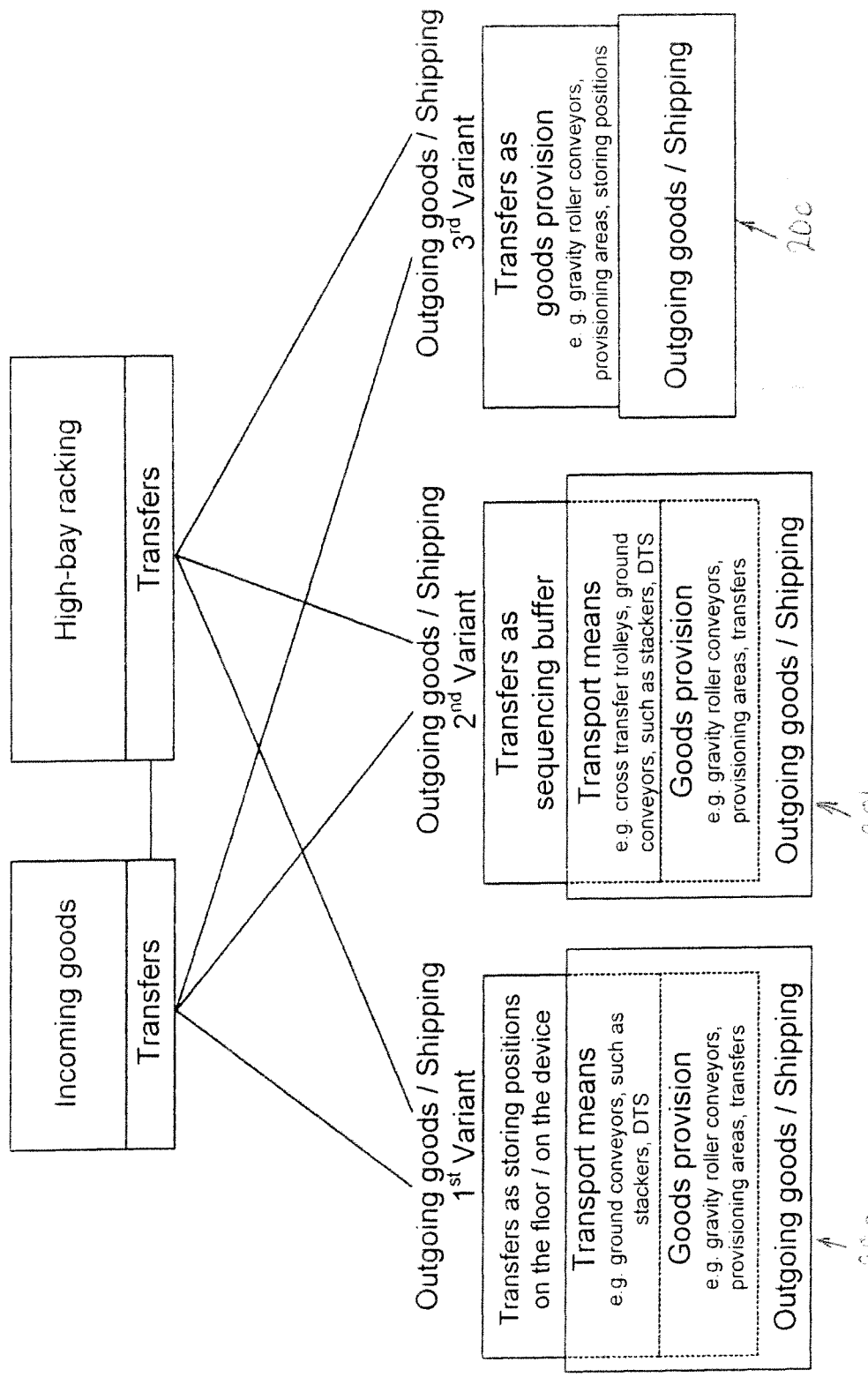
FIG. 4 schematically shows the preparation for shipping without/with sequencing according to three preferred embodiments.

In FIG. 4, the preparation for shipping with or without sequencing according to three different embodiments 20a-c is shown. Here, the individual steps of the goods to be stored or to be shipped are represented, each starting with the incoming goods to the outgoing goods or shipping, respectively. If received goods are initially temporarily stored in a high-bay warehouse, a transfer of the loading devices 4 with the goods 5 arranged on them is effected by means of the transport trolleys 1 into a high-bay warehouse, and the further transport from the high-bay warehouse towards shipping is effected only later.

According to the first represented embodiment 20a, the goods 5 are arranged on loading devices 4, and these loading devices are transported with the goods by the transport trolleys 1 according to the disclosure. Here, the goods are first transported to storing positions on devices, where the devices can essentially correspond to the transfer stations, i. e. the transport systems can drive under them, so that the loading devices with the goods arranged on them can be simply deposited and be moved further at any time by the one or other transport trolley. From the selected storing positions, the loading devices 4 with goods 5 arranged on them are simply transported further via transport means, such as fork lifts or the transport trolleys 1 according to the disclosure, either to be loaded by means of a fork lift, for example from the side or rear, into trucks, or to be transported to further transfer stations 3 which are linked with gravity roller conveyors from which rear loading of the goods can be effected, in most cases manually, for example via hand elevating trucks or electric elevating trucks or fork lifts. The loading devices 4 with load 5, however, can also be transported directly to transfer stations 3 which are connected with gravity roller conveyors.

According to the second represented embodiment 20b, the goods 5 are arranged on loading devices 4, and these loading devices with goods are transported to the selected sequencing locations by the transport trolleys 1 according to the disclosure. From there, the goods 5 can be withdrawn via cross transfer trolleys and placed onto gravity roller conveyors to make them ready for loading. As was already illustrated with respect to the first embodiment 20a, hand elevating trucks or electric elevating trucks or fork lifts for rear loading or else for side loading can be employed here.

According to the third shown embodiment 20c, the goods 5 are arranged on loading devices 4, and these loading devices with goods are transported by the transport trolleys 1 according to the disclosure to selected transfer storing positions in the region of the outgoing goods and stored temporarily, or be directly transported to transfer stations 3 which are linked with roller conveyors or gravity roller conveyors for their preparation for shipping. As represented in FIG. 2, the transfer stations 3 of the transport trolleys can be equipped here with roller conveyors 6 to thus permit an easy further transport of the individual goods 5.

It should be summarized that in the transport system according to the present disclosure, already known elements, such as fork lifts and gravity roller conveyors, are used and employed in combination with the transport trolleys 1 according to the disclosure, so that a very flexible system is achieved which optimally designs the operations between the incoming goods and the outgoing goods.

In addition, and as already described, in rear loading, the observance of the loading sequence can be effected on the provided gravity roller conveyors or by actively driven accumulating conveyors. Withdrawal to the truck is normally accomplished by hand elevating trucks or electric pallet trucks. In side loading of trucks, the pallets are directly withdrawn from the transfer station by stackers which load them onto the truck by driving laterally to them.

The invention is not restricted to the above embodiments. A plurality of variants and modifications is rather conceivable which make use of the idea according to the invention and therefore also fall into the scope of protection as recited in the impending claims.

What is claimed is:

1. A system for transporting goods arranged on loading devices between two areas, one area being a high-bay warehouse, comprising a driverless transport system with at least one transport trolley for transporting the goods together with the loading devices, the transport trolley including a lifting device which can be lifted and lowered above the trolley, and a transfer station under which the transport trolley can drive and from which the transport trolley can at least one of accept or transfer loading devices with load deposited thereon.

2. A system for transporting goods arranged on loading devices according to claim 1, wherein the at least one transport trolley can be driven freely movably.

3. A system for transporting goods arranged on loading devices according to claim 1, wherein the at least one transport trolley is remote-controlled.

4. A system for transporting goods arranged on loading devices according to claim 1, wherein the system can be controlled and administered by a superimposed control system.

5. A system for transporting goods arranged on loading devices according to claim 1, wherein the at least one transport trolley comprises a capacitive power supply.

6. A system for transporting goods arranged on loading devices according to claim 1, wherein the at least one transport trolley has a two-dimensional navigation.

7. A system for transporting goods arranged on loading devices according to claim 1, wherein the transfer station is stationary.

8. A system for transporting goods arranged on loading devices according to claim 1, wherein the transfer station includes at least one entry opening.

9. A system for transporting goods arranged on loading devices according to claim 1, wherein the transfer station is embodied in a U-shape.

10. A system for transporting goods arranged on loading devices according to claim 1, wherein the transfer station comprises non-driven conveyor means.

11. A system for transporting goods arranged on loading devices according to claim 1, wherein the transfer station is formed in the region of the high-bay warehouse by at least one cantilever arm of the high-bay warehouse.

12. A system for transporting goods according to claim 1, wherein the at least one transport trolley moves the goods between incoming goods from delivery or production and the high-bay warehouse, and at least one further transport trolley being provided to move the goods between the incoming goods through delivery or production, high-bay warehouse, and outgoing goods or shipping, respectively.

13. A system for transporting goods arranged on loading devices according to claim 11, wherein the transfer station is linked to gravity roller conveyors for the preparation for shipping in a region of the outgoing goods.

14. A system for transporting goods arranged on loading devices according to claim 11, wherein the transfer station temporarily buffers the loading devices with goods in a region of the outgoing goods.

15. A system for transporting goods arranged on loading devices according to claim 14, wherein in the region of the outgoing goods, temporarily buffered loading devices with goods are distributed onto gravity roller conveyors for their preparation for shipping by a further conveyor.

16. A system for transporting goods arranged on loading devices according to claim 13, wherein the loading devices with goods are loaded from the gravity roller conveyors onto one or more trucks by means of elevating trucks or electric pallet stackers.

17. A system for transporting goods arranged on loading devices according to claim 12, wherein storing positions for temporarily storing the loading devices with goods to which the transport trolleys can drive are additionally provided, where the loading devices with goods are transported further from these spaces via transport trolleys or fork lifts according to a predetermined sequence.

18. A system according to claim 1, wherein the at least one transport trolley comprises a battery with short charge cycles.

19. A system according to claim 1, wherein the at least one transport trolley comprises a battery without short charge cycles.

20. A system according to claim 1, wherein the transfer station is embodied in the form of two opposite rail elements.

21. A system according to claim 1, wherein the transfer stations is embodied in the form of two opposite web elements.

22. A system according to claim 12, wherein the goods comprise raw materials and operating materials.

23. A system according to claim 1, wherein at least one further transport trolley moves the goods between incoming goods through delivery or production, high-bay warehouse, and outgoing goods or shipping, respectively.

* * * * *